3,183,186
SLUDGE CONDITIONING
Thomas H. Oster, 156 S. Franklin St., Dearborn, Mich.
No Drawing. Filed Apr. 11, 1962, Ser. No. 186,634
2 Claims. (Cl. 210—52)

This invention relates to the sewage treatment industry and is more particularly directed to an improvement in the art of conditioning sewage sludges for dewatering.

The conventional sewage sludge usually contains at least three percent dry solids. Such sludges are usually at least ninety percent water. The solids must be separated from the bulk of the water so that they may be disposed of by incineration. Sewage sludge is almost invariably unfilterable and must be conditioned before filtration is attempted.

The conditioning of the sludges for filtration is usually accomplished by a treatment with ferric chloride and lime. The annual usage of ferric chloride for this purpose is about forty thousand tons per year. After a sludge has been conditioned by the addition of ferric chloride and lime, it is dewatered upon rotary vacuum filters. The cake produced upon these filters is then disposed of, usually by incineration.

The sewage industry has often attempted to substitute ferrous sulphate for ferric chloride in sewage sludge conditioning operations. These attempts have been uniformly unsuccessful. Such substitution of ferrous sulphate for ferric chloride has been abandoned despite the fact that ferrous sulphate is available on a very large scale as a by-product of steel pickling operations and at a price much lower than that commanded by ferric chloride. In many locations the disposal of ferrous sulphate from pickling operations is itself a costly operation for the steel industry.

I have discovered that the chemical character of aqueous solutions of ferrous sulphate begins to change radically at a temperature of about 95° F. I have further discovered that sewage sludge may be conditioned for filtration by treating the sludge at temperature above about 95° F. by the combination of ferrous sulphate and lime. Under the proper conditions, ferrous sulphate becomes superior to ferric chloride as a sludge conditioning agent. A given weight of iron as ferrous sulphate is practically as effective for sludge as the same weight of iron as ferric chloride, and produces a drier and hence more burnable cake.

The following test results are submitted to demonstrate the efficacy of ferrous sulphate and lime for the conditioning of sewage sludge. The sludge treated was secured from the Jefferson Avenue Station which handles the bulk of Detroit's sewage. The sample treated has a dry solids content of about 1.05 pounds per gallon and was being successfully treated by the addition of 1.50% of ferric chloride and 7.5% of lime. These percentages refer to dry chemicals and are based upon the weight of the dry solids.

In preparation for these tests the following solutions were prepared. Thirty grams of anhydrous ferric chloride was dissolved in water and made up to 300 cubic centimeters. Seventeen grams of ferrous sulphate septahydrate was dissolved in water and made up to 100 cubic centimeters. A ten percent slurry of calcium carbide lime in water was prepared. A sample of 100 cubic centimeters of sludge was treated at the temperature indicated with 10 cubic centimeters of the lime slurry and 2 cubic centimeters of the indicated iron salt. The iron salt was stirred into the sludge for thirty seconds, the lime slurry was added and stirred for thirty seconds, and the product so prepared was filtered promptly under a vacuum of twenty inches of mercury through a nine centimeter Büchner funnel. The time noted was measured from the time of the application of the vacuum until the vacuum break occured. This is a standard test used in the sewage industry for the evaluation of sludge conditioning agents. In each of these tests the dosages of iron and lime is approximately that used in Detroit commercial practice. Particular attention is invited to the fifth column in the tabulations below. This column is concerned with the ratio of water to solids in the filter cake and is a direct measure of the burnability of the filter cake.

The first 10 tests indicate commercial practice with ferrous sulphate substituted for ferric chloride. The amount of ferrous sulphate was chosen to give an iron concentration equal to commercial ferric chloride practice. Tests 11, 12 and 13 show the effect of heating upon the conventional ferric chloride practice. In each of Tests 1 to 13 the chemicals were added to the heated sludge. In Test 14 the ferrous sulphate was added to the cold sludge prior to heating and the lime to the heated mixture. In Tests 15 and 16 both the ferrous sulphate and the lime were added to the cold sludge which was then heated.

| Test number | Temperature, °F. | Wet cake, grams | Dry cake, grams | Water-solids ratio in cake | Time, seconds |
|---|---|---|---|---|---|
| $FeSO_4$ | | | | | |
| 1 | 65 | 50.25 | 11.85 | 3.24 | 75 |
| 2 | 75 | 52.05 | 12.85 | 3.06 | 76 |
| 3 | 85 | 49.75 | 12.35 | 3.03 | 58 |
| 4 | 90 | 53.25 | 12.78 | 3.17 | 64 |
| 5 | 95 | 50.85 | 12.33 | 3.12 | 59 |
| 6 | 100 | 47.50 | 12.85 | 2.69 | |
| 7 | 110 | 44.9 | 12.85 | 2.49 | 63 |
| 8 | 120 | 40.85 | 12.33 | 2.30 | 90 |
| 9 | 130 | 44.20 | 11.30 | 2.97 | 63 |
| 10 | 140 | 44.70 | 12.00 | 2.80 | 66 |
| $FeCl_3$ | | | | | |
| 11 | 70 | 55.05 | 12.95 | 3.25 | 47 |
| 12 | Cold | 54.25 | 11.85 | 3.58 | 52 |
| 13 | 110 | 52.0 | 12.57 | 3.14 | 37 |
| $FeSO_4$ | | | | | |
| 14 | 110 | 45.70 | 12.32 | 2.71 | [1] 57 |
| 15 | 110 | 51.0 | 12.8 | 2.99 | [2] 62 |
| 16 | 110 | 52.2 | 13.5 | 2.87 | [2] 74 |

[1] $FeSO_4$ added prior to heating.
[2] $FeSO_4$ plus lime added prior to heating.

These tests indicate clearly that the action of ferrous sulphate as a conditioning agent changes sharply at about 95° F. The upper limit of temperature to be employed will be fixed by such factors as odor control, fuel cost and excessive heat loss. Within such limits, the optimum working temperature should be determined experimentally for each individual plant. The effect of heating upon ferric chloride conditioned sludges is favorable, but not as radical as with ferrous sulphate conditioned sludges. It is anticipated that other iron-based conditioning agents such as ferrous chloride and chlorinated copper as will be benefitted.

I claim as my invention:

1. In the process for dewatering sewage sludge wherein the sludge is conditioned, prior to dewatering, by treatment with lime and ferrous sulphate, the improvement which comprises effecting at least a portion of the conditioning action of the ferrous sulphate while the sludge is at a temperature between 95° F. and 130° F. and dewatering the sludge so conditioned.

2. The process recited in claim 1 in which at least a portion of the conditioning action of the ferrous sulphate is effected at a temperature between 100° F. and 130° F.

(References on following page)

References Cited by the Examiner

FOREIGN PATENTS 19,395    1891    Great Britain.
2,560    1892    Great Britain.

OTHER REFERENCES

Mohlman et al.: Ind. Eng. Chem. 26, 226 (1934).
Groen: The Use of Steel-Pickling Liquors for Sewage-Sludge Conditioning, Sewage Works J. vol. 21, 1949, pp. 1037–1049.
Murray et al.: Sludge Digestion, the Effect of Temperature, S. African Ind. Chemist, vol. 3, 1950 pp. 33–36.
Keefer: Sewage-Treatment Works, First Edition, 1940, McGraw-Hill, pp. 416–453, page 435 particularly relied on.

MORRIS O. WOLK, *Primary Examiner.*